(12) United States Patent
Silverman et al.

(10) Patent No.: US 8,954,781 B2
(45) Date of Patent: *Feb. 10, 2015

(54) REALTIME TEST RESULT PROMULGATION FROM NETWORK COMPONENT TEST DEVICE

(71) Applicant: Spirent Communications, Inc., Sunnyvale, CA (US)

(72) Inventors: Brian Silverman, Santa Clarita, CA (US); Tom McBeath, Simi Valley, CA (US); Abhitesh Kastuar, Simi Valley, CA (US); Sergey Rathon, Raleigh, NC (US)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/022,032

(22) Filed: Sep. 9, 2013

(65) Prior Publication Data

US 2014/0013158 A1 Jan. 9, 2014

Related U.S. Application Data

(63) Continuation of application No. 13/118,843, filed on May 31, 2011, now Pat. No. 8,533,524, which is a continuation of application No. 12/130,963, filed on May 30, 2008, now Pat. No. 7,958,387.

(51) Int. Cl.
  *G06F 11/00* (2006.01)
  *G06F 11/22* (2006.01)
  *G06F 11/27* (2006.01)

(52) U.S. Cl.
  CPC ............ *G06F 11/27* (2013.01); *G06F 11/2294* (2013.01)
  USPC .............................. 714/4.1; 709/223; 709/224

(58) Field of Classification Search
  None
  See application file for complete search history.

(56) References Cited

U.S. PATENT DOCUMENTS

| | | | |
|---|---|---|---|
| 5,812,826 A | 9/1998 | McLain, Jr. | |
| 6,252,891 B1 | 6/2001 | Perches | |
| 6,728,929 B1 | 4/2004 | Luong | |
| 7,016,340 B1 | 3/2006 | McKinion | |
| 7,158,907 B1 | 1/2007 | Soldo | |
| 7,162,377 B2 | 1/2007 | Amrod et al. | |
| 7,181,360 B1 | 2/2007 | Nikolac et al. | |
| 7,272,114 B1 | 9/2007 | Barkan | |
| 7,342,897 B1 | 3/2008 | Nader et al. | |
| 7,603,266 B2 | 10/2009 | Ramanathan | |
| 7,636,653 B1 | 12/2009 | Chan et al. | |
| 2002/0007461 A1* | 1/2002 | Garrison | 713/202 |
| 2002/0156885 A1 | 10/2002 | Thakkar | |
| 2003/0033406 A1* | 2/2003 | John et al. | 709/224 |
| 2003/0172177 A1 | 9/2003 | Kersley et al. | |

(Continued)

OTHER PUBLICATIONS

Spirent Communications: Inspired Innovation. Reference Manual: Spirent TestCenter System. Aug. 2006. 134 pages.

(Continued)

*Primary Examiner* — Yolanda L Wilson
(74) *Attorney, Agent, or Firm* — Haynes Beffel & Wolfeld LLP; Ernest J. Beffel, Jr.

(57) ABSTRACT

The technology disclosed relates to real-time collection and flexible reporting of test data. In particular, it is useful when collecting packet counts during tests of network devices that simulate thousands or even millions of data sessions conducted through a device under test ("DUT").

10 Claims, 8 Drawing Sheets

(56) References Cited

U.S. PATENT DOCUMENTS

| | | |
|---|---|---|
| 2004/0190519 A1 | 9/2004 | Dugatkin |
| 2004/0240440 A1 | 12/2004 | Wild et al. |
| 2005/0066086 A1 | 3/2005 | Ramanathan |
| 2005/0259594 A1 | 11/2005 | Smith |
| 2006/0013252 A1 | 1/2006 | Smith |
| 2006/0045021 A1 | 3/2006 | Deragon et al. |
| 2008/0031151 A1 | 2/2008 | Williams |
| 2008/0198742 A1 | 8/2008 | Kaempfer |
| 2008/0201312 A1* | 8/2008 | Posner ............................ 707/4 |
| 2009/0296590 A1 | 12/2009 | Joyner |

OTHER PUBLICATIONS

Notice of Allowance, mailed Feb. 12, 2010. U.S. Appl. No. 12/131,944. 10 pages.

Notice of Allowance, mailed Jun. 25, 2010. U.S. Appl. No. 12/131,944. 10 pages.

* cited by examiner

REALTIME TEST RESULT PROMULGATION FROM NETWORK COMPONENT TEST DEVICE

RELATED APPLICATION

This application is a continuation application of U.S. application Ser. No. 13/118,843, filed 31 May 2011, entitled "REALTIME TEST RESULT PROMULGATION FROM NETWORK COMPONENT TEST DEVICE," by inventors Brian Silverman, Thomas R. McBeath, Abhitesh Kastuar, and Sergey Rathon, now U.S. Pat. No. 8,533,524, issued 10 Sep. 2013.

This application is a continuation application of U.S. application Ser. No. 12/130,963, filed 30 May 2008, entitled "REALTIME TEST RESULT PROMULGATION FROM NETWORK COMPONENT TEST DEVICE," by inventors Brian Silverman, Abhitesh Kastuar, Thomas R. McBeath and Sergey Rathon, now U.S. Pat. No. 7,958,387, issued 7 Jun. 2011.

This application is related to U.S. patent application Ser. No. 12/130,944, filed 30 May 2008, entitled "METHOD AND DEVICE USING TEST DATA STREAMS BOUND TO EMULATED DEVICES," by inventors Abhitesh Kastuar, Jan-Michael Kho and KaChon Lei, now U.S. Pat. No. 7,826,381, issued 2 Nov. 2010.

This application is also related to U.S. patent application Ser. No. 12/130,854, filed 30 May 2008, entitled "METHOD AND APPARATUS FOR EMULATING NETWORK DEVICES," by inventor David Joyner, now U.S. Pat. No. 8,264,972, issued 11 Sep. 2012. The related applications are incorporated by reference.

BACKGROUND OF THE INVENTION

The technology disclosed relates to real-time collection and flexible reporting of test data. In particular, it is useful when collecting packet counts during tests of network devices that simulate thousands or even millions of data sessions conducted through a device under test ("DUT").

The Internet and backbone networks handle a very large volume of data traffic. The routers and switches that handle these volumes of data are much different from the equipment that ordinary people have in their homes. While the names are the same, the capacities and protocols are much different.

In addition to backbone infrastructure, so called triple play infrastructure is being deployed at a local level. Triple play infrastructure involves high volumes of data, because it delivers voice, data and HDTV services into homes, typically using a single physical channel. Both scheduled, broadcast HDTV and HDTV on-demand have the potential of creating packet loads that far exceed the data demands of even the most ambitious websurfer.

During development and prior to deployment, it is useful to test high capacity routers, switches and hybrid devices. Testing is particularly important as new features are added and old features are enhanced. Many alternative protocols exist for carrying packets from one point to another. The more alternative protocols a device attempts to accommodate, the greater the likelihood of unpredicted interactions.

Regression testing is one tool for making sure that new features do not break existing components. In regression testing, previously run-tests are repeated to assure that new functions have been implemented without impairing old ones. Elaborate scripts are often developed for regression testing.

During development and prior to deployment, conformance, functional, performance and passive testing may be conducted. Conformance testing allows developers to verify that the operation of their device conforms to established, industry-accepted standards, conventions, or rules, such as RFCs or draft standards. During functional testing, developers verify that the device does everything that it has been designed to do, including protocol support, filtering, and management functions. Performance testing provides information about levels of performance, such as throughput, frame loss, latency, route pairing, or scalability. This approach includes stress testing to show how a device behaves under load conditions. In addition, passive testing can be performed to analyze protocol performance, either intrusively or non-intrusively.

A test device that stresses a core router, for instance, may include a dozen or more interfaces that operate at 10 or 40 gigabits. In test configurations for backbone core routers or interconnect switch fabrics, multiple test devices may be combined into a single test system that generates an enormous amount of test data.

It is difficult or impossible, using conventional data processing approaches, to respond to data queries in real time, during a test. At the end of a test, it can take hours to collect test sample data and marshal it into a database.

An opportunity arises to introduce a new data collection and distribution architecture that is adapted to test devices. Better, more timely and more responsive testing may result, with significant benefits to those who develop and deploy high-volume routers and switches.

SUMMARY OF THE INVENTION

The technology disclosed relates to real-time collection and flexible reporting of test data. In particular, it is useful when collecting packet counts during tests of network devices, such as stress tests that simulate thousands or even millions of data sessions conducted through a device under test (DUT). Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
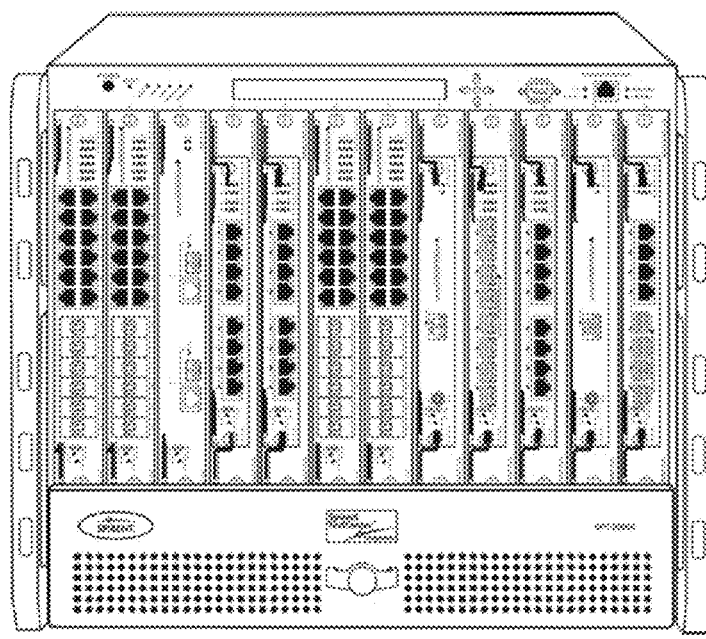
FIG. 1 is a line drawing of a Spirent™ SPT-9000A test chassis.

FIG. 1 is a line drawing of a Spirent™ SPT-9000A test chassis. The Spirent TestCenter SPT-9000A is one in a family of network test systems. Other members include the SPT-5000A, a high density network performance test system and the portable SPT-2000A/HS. Among this family, the SPT-9000A is the very high density test member typically used in the lab or a production test environment.

This test device is highly suitable, where high density Ethernet ports are desired for high-volume production and large port count testing. This test device has 12 vertical slots that can support a variety of configurations. For instance, the chassis can be filled with up to 144 10/100/1000 Mb per second Ethernet ports. Or, it can be filled with 144 fiber or dual media gigabit Ethernet ports. It can support up to 24 10-gigabit Ethernet ports, 24 UniPHY (10 GbE/OC-192 POS) ports, 24 WAN OC-48/12/3 POS ports or 24 10 GBASE-T ports. It is anticipated that 40 GbE and 100 GbE ports also will be supported, as testing requirements rise. FIG. 1 depicts a mix of these port types.

The Spirent TestCenter™ is one example of integrated performance analysis and service assurance systems that enable the development and deployment of next-generation networking technology, such as Internet telephony, broadband services, 3G wireless, global navigation satellite systems and network security equipment. The technology described in this disclosure applies to Spirent TestCenter™ products and generally to IP performance test systems and service verification platforms for IP-based infrastructure and services. This technology is useful in systems that test and validate performance and scalability characteristics of next-generation networking technology for voice, video and data services. Test devices, using the technology disclosed, are useful to network and telephony equipment manufacturers, semiconductor manufacturers, service providers, government departments, and enterprises to validate the capabilities and reliabilities of complex IP networks, devices and applications, such as networks for delivery of triple play packages that include voice, and video and data services. The technology disclosed is useful in testing both control plane and data plane traffic.

Figure 2:
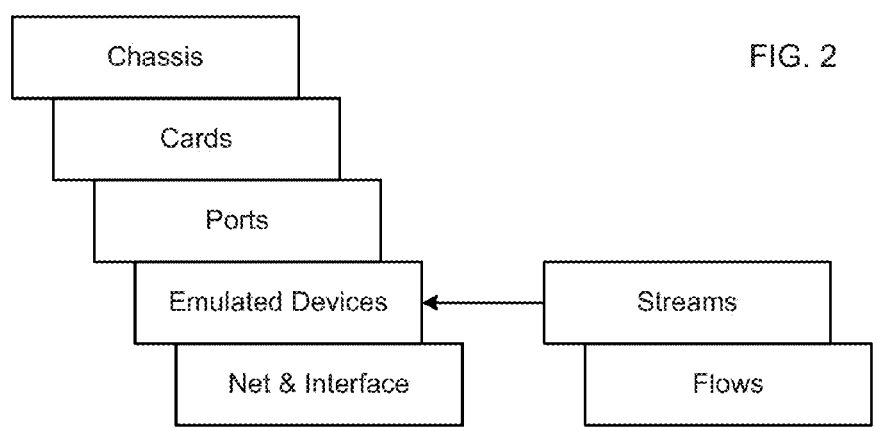
FIG. 2 is a high-level block diagram of some physical and logical entities that combined as a test device.

FIG. 2 is a high-level block diagram of some physical and logical entities that combined as a test device. The test device may include one or more chassis. Multiple chassis 201, such as the SPT-9000A, can communicate among themselves to conduct a test with a large number of ports. As illustrated, a chassis may include multiple processor cards 203 and each card may support multiple ports 207. At a logical test level, a variety of device types can be emulated at a port. An emulated device has a variety of configurable characteristics 209, such as network connectivity characteristics, host features and interfaces. Emulated devices and their configuration are more fully described in the context of FIG. 3, below. Test streams 211 are coupled to emulated devices and their configured characteristics. Multiple streams of test data can be associated with a pair of test devices. A stream of test data may be configured to represent a multiplicity of sessions where each session is called a flow. A flow represents a network user accessing network services such as a server on the Internet, peer-to-peer communications with another user, etc. Each network user would have her own Ethernet MAC Address and IP Address. The users' IP addresses might be dynamically configured. In some embodiments of the test device, streams and flows are differentiated primarily by the granularity of test data collection. In this embodiment, separate banks of counters are maintained for keeping track of each stream, but individual flows within a stream are not separately tracked.

The logical hierarchy of elements depicted in FIG. 2 supports flexible scaling of tests. A small chassis with one or two cards can test a relatively small router or switch. Or, a cluster of chassis can be combined to test a very powerful backbone core router or switch. With this background, general outlines of an innovative distributed database within a chassis can be described.

Prior to implementing the technology described below, it could take hours to download test statistics, from one or more high-volume chassis, at the end of a test. The prior strategy was very direct. A management level application would directly query processes running on the processing cards of the chassis. The processing cards would return all of the data that they had collected. The management application would successively send queries and receive results from all the processing cards involved. Data received would be encapsulated in objects. The objects would be passed to a database adapter and the database would be updated.

In one embodiment, this innovative approach adds a distributed database layer running on each processing card, with multiple instantiations of databases, including tables and database access software, per processing card. It is surprising that adding a database processing layer could speed up the collection of test data, at the end of a test and enables real-time reporting during a test. Ordinarily, one would expect that adding an additional, intermediate database software layer would only slow things down. It is further surprising that instantiating multiple instances of databases per processor, again including tables and database access software, could be efficient. In testing, the innovative approach that we disclose has dramatically reduced the time required to collect end-of-test results by about two orders of magnitude, from hours to minutes.

The databases are embedded, in-memory databases that have both proprietary API and SQL interfaces. A data collection routine retrieves statistics from counters with a predetermined or programmed resolution, such as every second or 10th of a second. The data collection routine uses the database API to add rows of sampled values to database tables. In one embodiment, there is a separate database instantiated for each port on each processing card. Different types of traffic on the port can be maintained in different tables. In a high resolution mode, data collection in limited domains may be as frequent as every millisecond or every $100^{th}$ of a second, as specified by a user.

It is surprising that numerous in-memory databases can be practically managed with better performance than fewer databases. In practice, use of numerous databases with simple table structures and transactions that require minimal locking has provided strong performance.

It is further surprising that using numerous databases with SQL query interfaces works well. The eXtremeDB™ embedded in-memory database has an SQL interface (eXtremeSQL™) and is commercially available from McObject at www.mcobject.com. The SQL interface is fast and efficient enough to be used for real time queries during a test.

Overall, surprisingly good results have been achieved by the approach disclosed, despite introduction of a new database layer between the management application and the counters maintained by hardware, despite using multiple instantiations of databases per processor, and despite using SQL queries for data retrieval. Nearly a hundred-fold improvement in end-of-test data retrieval has been achieved and real time reporting can be realized.

Figure 3:
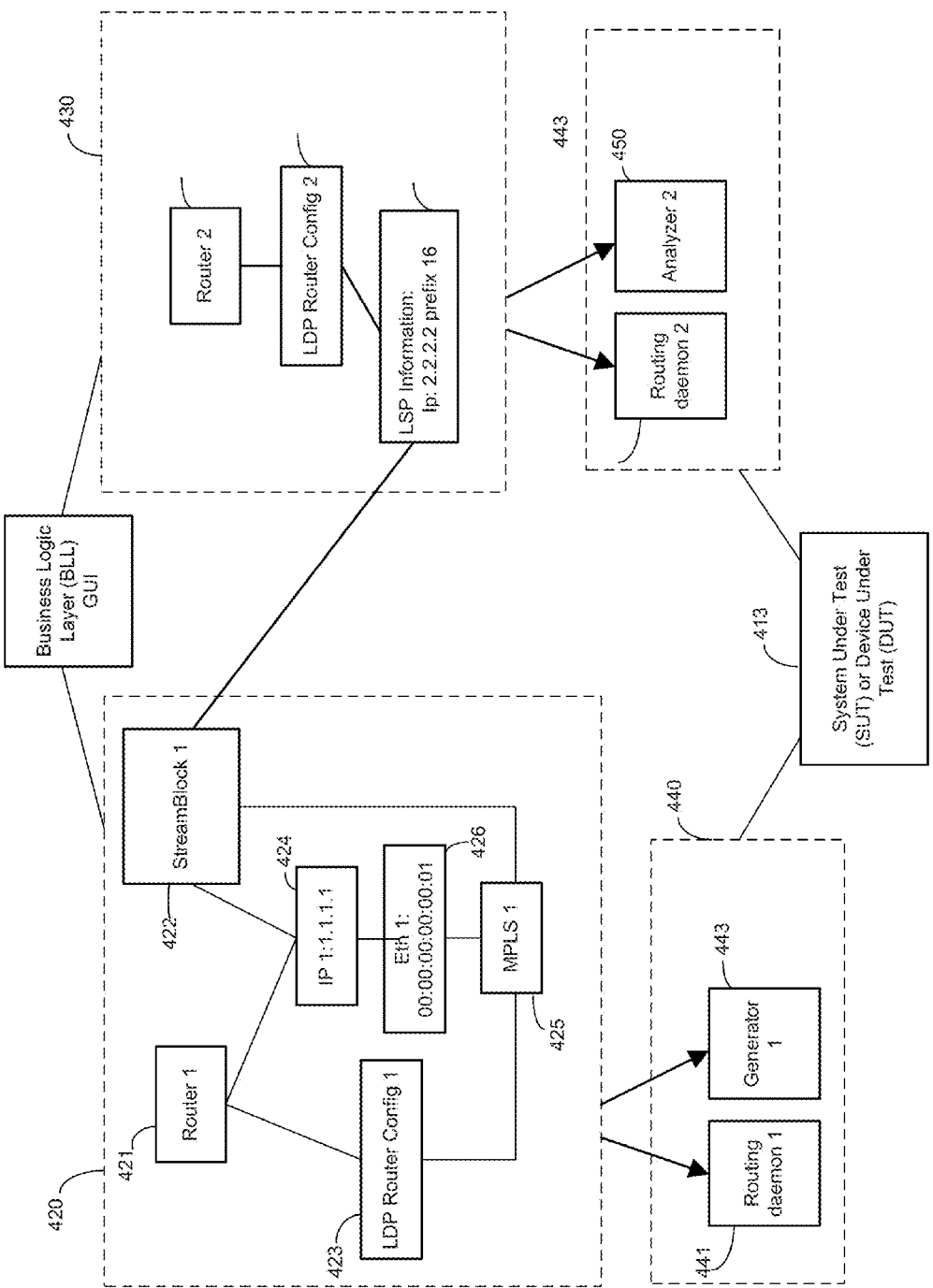
FIG. 3 is a high-level block diagram of a test device coupled to a DUT, with emphasis on configuration of stream blocks.

FIG. 3 is a high-level block diagram of a test device coupled to a DUT, with emphasis on configuration of stream blocks. FIG. 3 generally depicts a two port test with test packets moving from port one through the DUT to port two. On logical port one (320), in this example, the emulated ingress device 321 is a router. It might alternatively be a switch or a hybrid device. In this example, including the MPLS protocol, it is coupled to network connectivity object 323 and a stack of interface definition objects 324, 325, 326. The network connectivity object is a Label Distribution Protocol (LDP) router configuration 323, which relates to the MPLS interface 325. The interface stack depicted includes IP (324), MPLS (325) and Ethernet/MAC address (326) objects. The network connectivity and interface stack objects publish their data to an observer that is part of the stream block object 322. The stream block object 322 corresponds to data streams that will be generated on port one (320), which is attached to an ingress port of the DUT. The stream block object 322 subscribes to or observes data initially configured and later updated on the network connectivity and interface objects. Binding the stream block 322 to a source emulated object sets up a so-called observer pattern, as does binding the stream block to a destination emulated object. On port two (330), the emulated egress device 331 of this example also is a router. In other examples, it could be a switch or a hybrid device. The network connectivity objects and interface objects connected to the router 331 include an LDP router configuration 333 and Label Switching Protocol (LSP) information 335. These are network connectivity and interface objects for a downstream device that uses the MPLS label-based switching and routing protocol. When an MPLS session is initiated, the LDP generates LSP information, which is distributed from the downstream router, through the DUT to the upstream router. The configuration objects at the BLL layer for the ports 320, 330 are in communication with so-called firmware at the IL layer. This firmware is more closely coupled to the physical ports of the test device than the BLL. In the upstream position, the configuration objects are in communication with the routing daemon 341 and a generator 343. The routing daemon, depicted here as a single daemon, may actually be implemented as a series of routing daemons for various protocols. The routing daemons may generate and/or receive routing address information. For instance, in a DHCP implementation, routing daemon 341 may listen for updated IP address information as DHCP leases expire. When the routing daemon detects new address information, it publishes that information to other components. In one embodiment, the stream block or IP configuration object observes, listens to, or receives messages from the routing daemon with updated IP address information. Then, the generator 343 may observe the stream block 322 for updated IP information. In another embodiment, updated routing information may be directly forwarded from the routing daemon to the generator at the IL layer, as well is being published for the BLL objects to update themselves. At the firmware layer, the protocols illustrated in FIG. 3 use the routing daemon 351 on IL layer port two 350 and test result analysis relies on the analyzer 353.

In this testing configuration, only one stream block is depicted, corresponding to packets traveling from port one to port two. In actual testing, packets may be generated on each of the ports and sent back and forth. Then, two or more stream blocks would be used. In general, high-volume testing uses stateless generation of test packets. That is, packets generated for port one depend on address or control plane information that identifies port two sufficiently for routing, but do not follow a request-and-response model on the data plane. The data plane traffic is stateless.

We refer to stream block 322 as a bound stream block, in contrast to the raw stream blocks of earlier products. A bound stream block has source and destination bindings. From the bindings, the stream block learns both static information used to construct a prototype test frame or test packets and dynamic address information that is generated by operation of the control plane. The process for learning information, using the observer pattern, involves different data and program structures than the old approach of using a wizard to add the same data to different data structures. The observer pattern has the additional advantage that it updates dynamic address information during a test, which is a natural part of many test scenarios. Address updates are dynamically propagated and quickly reflected in test packet traffic. Other processes for learning information, such as inter-process communications via pipes, could be used instead of following the observer model.

Figure 4:
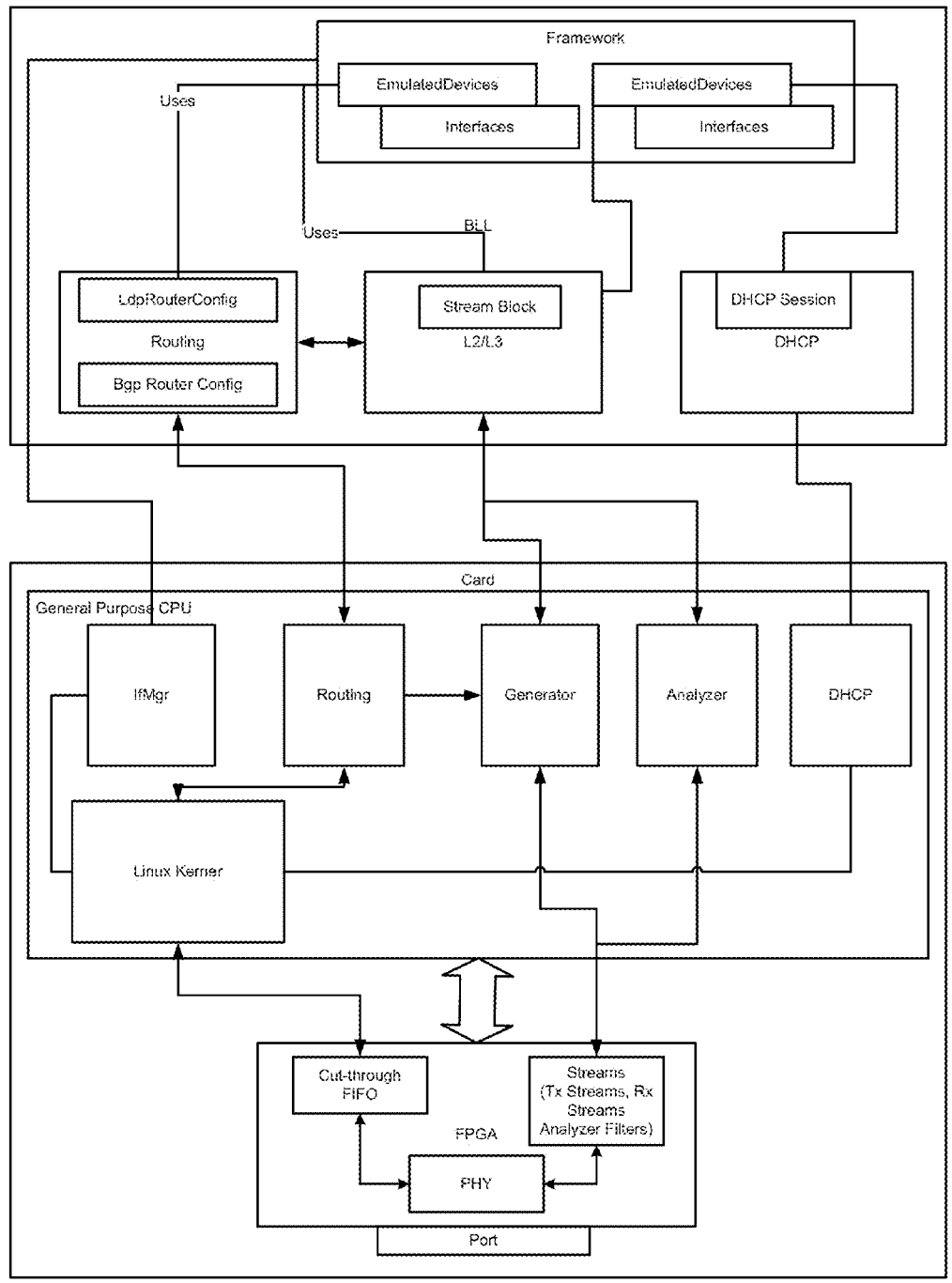
FIG. 4 is a high-level block diagram of a test device, with emphasis on software modules at levels of management logic and processing card logic.

FIG. 4 is a high-level block diagram of a test device, with emphasis on software modules at levels of management logic and processing card logic. The management logic 410 in this embodiment runs on a separate computer coupled in communication with a chassis that holds processing cards 440. For instance, the management logic can run on a laptop, desktop or workstation. Alternatively, the chassis of the test device could have a built-in processor and other resources, or the chassis, could accept a processor card that would run the management logic. Then, a terminal or monitor could be coupled to the chassis to manage data collection. The processing card logic of this embodiment, sometimes called firmware, includes components running on a general purpose CPU 450, and components implemented in an FPGA 470, are sometimes called hardware. As compared to FIG. 3, this figure reveals more of the modular programming structure and less of the data structure.

The management logic 410 includes a framework 420 and components for routing 431, layer 2/layer 3 tests frame generation 435, and a DHCP host 437. The framework is where the emulated devices 421A, 421B and their interfaces 422A, 422B are modeled. These emulated devices are comparable to 321, 331 in FIG. 3. The interfaces are comparable to 324, 325, 326. The routing component 431 depicts support for two routing protocols, label LDP 432 (see, e.g., RFC 5036) and Border Gateway Protocol (BGP) 433 (see, e.g., RFC 4271). The routing component supports a variety of routing protocols and may use separate subcomponents or daemons to do so. The routing component is responsible for setting up IP routing via the DUT. The layer 2/layer 3 component 435 includes bound stream blocks 436 that define test frames. A bound stream block is bound to an ingress device 421A and an egress device 421B. It may be updated with routing information through one of the emulated devices or directly from the routing component. This figure adds a DHCP component 437 that supports a DHCP session 438. For instance, the emulated egress device, 421B, may serve as a DHCP client and receive its address from a DHCP host. Routing component 431 has a counterpart routing component 451. Stream block component 436 has counterpart generator 455 and analyzer 456 components for the ingress and egress functions on a test, respectively. DHCP component 437 has a corresponding DHCP component 457. The routing, generator, analyzer, and DHCP components running on the processor are implemented, in one embodiment, by respective daemons per processing card. A large number of emulated devices and their interfaces on the processing card can be handled by a single routing component 451 and a single DHCP component 457. Alternatively, additional routing components and DHCP components could be allocated. The component IfMgr 416 is an internal object that manages network interfaces and validation of interfaces. The IfMgr, routing component, and host component interact with the Linux kernel. The routing and host components generate control plane packets that the Linux kernel processes. The generator 455 and analyzer 456 components operate in the data plane of the ingress port and egress port, respectively. They process test descriptions available from the interfaces bound to the stream block 436. In some embodiments, routing information learned at the routing daemon 451 may be passed directly to the generator daemon 455 in addition to being propagated upwards to the management logic 410. The generator and analyzer demons interact with the streams components 473 of the FPGA.

On the FPGA 470 control plane data is handled by a cut through FIFO 471 that interacts with PHY, which schedules transmission of the control plane packets across the port 474. A cut through FIFO is appropriate because the FPGA processing of control plane packets is minimal. On the other hand, data plane test frames and packets are the primary reason for use of an FPGA. Details of the FPGA streams components 473 are beyond the scope of this disclosure. The streams components 473 build test frames to be sent across PHY 472 and the port number 474 and processes test frames received across these components.

Figure 5:
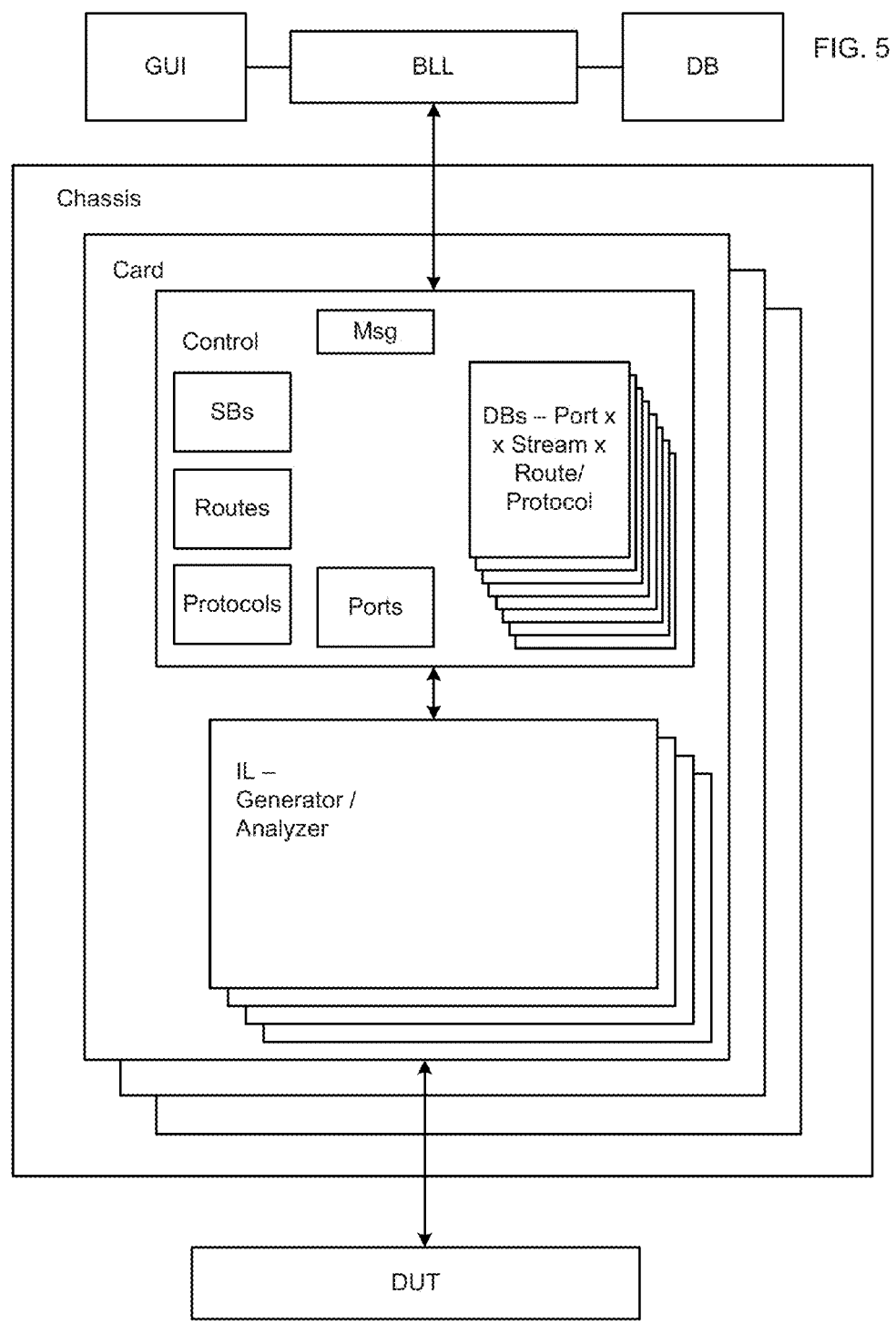
FIG. 5 is a high-level block diagram, with emphasis on instantiation of multiple databases.

Overall, from FIG. 4, one sees architectural detail around which the database instantiations, depicted in FIG. 5, are organized.

FIG. 5 is a high-level block diagram, with emphasis on instantiation of multiple databases. On the processing card 440 the message handling component 562 and the multiple instantiations of databases 559 are new to this figure. Other components of the processing card including interfaces 422, routes 432, stream blocks 436 and the instrument layer generator and analyzer 470, which retain their reference numbers from the prior figure. The chassis 520 includes one or more processing cards 440. Alternatively, a server or cluster of servers could include processors and, to whatever extent necessary, specialized logic processors. Workstations or PCs might be substituted for servers. The chassis includes a least one communications channel for coupling the processing cards to management logic.

The management logic is again represented by the BLL 410. In this figure, the BLL is coupled in communication with the graphic user interface (GUI) 511, and a persistent database 515. It includes a variety of components that are further described below. The graphic user interface may accept configuration data for emulated devices, interfaces and routing. It may accept test requirements for stream blocks. During a test, it may accept query requests and return test data sample results. At the end of the test, it may accept a command to retrieve and persist all test data and may display results from persisting the data. The persistent database 515, unlike the in-memory databases 559, is limited by channel characteristics of persistent memory. For instance, the channel and rotating media characteristics impact the performance of a disk drive used as persistent memory. Alternatively, an optical memory or non-rotating memory could be used. At present, the disk drive is the most favorably priced high speed access device for large volumes of test data.

The processing card 450 includes at least one processor 551 and solid-state memory 553 coupled in communication with the processor, which provide resources for operation of the logic. The processing card includes two or more ports 340, 350, 474 that are adapted to be coupled to a device under test 313.

Distributed logic running on the processing cards includes a plurality of database instances. As explained above, eXtremeDB™ is a suitable in memory database. In a typical test with a dozen or more ports, numerous database instances may run on one or more processing cards. In one embodiment, the number of database instances will be one per port, with various tables for various types of data. A separate database instance could be instantiated for each port and each protocol handling object associated with each port, so that different sample data statistics applicable to different protocols are stored in different database instances. With finer granularity, the test may be organized into a plurality of test data streams that emulate a multiplicity of data sessions. Database instances may be instantiated per port and per test data stream. Or, they may be instantiated per port, per protocol handling object (for network connectivity and interfaces) and per test data stream.

In one of the alternative embodiments, a plurality of database instances run on a particular processing card to support a corresponding plurality of ports. Database instances support different tables for different protocol handling objects or for different categories of information. Instead of having a separate database instance each protocol supported by the port, there may be a separate table within a database instance associated with a port. Similarly, the number of database instances may be reduced by including a stream number in each table row and storing test data samples from multiple inbound streams in a single table. This alternative may be used with separate database instances for different protocol handling objects or it may be combined with use of different tables for different protocol handling objects, within a single database instance for the port.

In FIG. 5, the BLL 410 includes a data selection component 512 that translates user requests into queries for responsive data. It also includes a messaging component 514 that identifies a plurality of database instances to which queries should be addressed. The messaging component 514 sends the query is to the identified database instances. In one embodiment, a particular query is sent in a series of unicast messages, one per database instance from which data is requested. Alternatively, a multicast-like messaging scheme could be developed to reduce the number of messages. Preferably, the messaging component sends out successive queries to successive database instances without waiting for responses. Then, it receives responses in parallel as they become available, without waiting for completion of database operations. The BLL 410 further includes a response segregation component 516 that combines the selected sample data from the responses and an output component 518 that either persists the combined data in the persistent database 515 or makes the combined data in some form perceptible to the user, for instance via the GUI 511.

Figure 6:
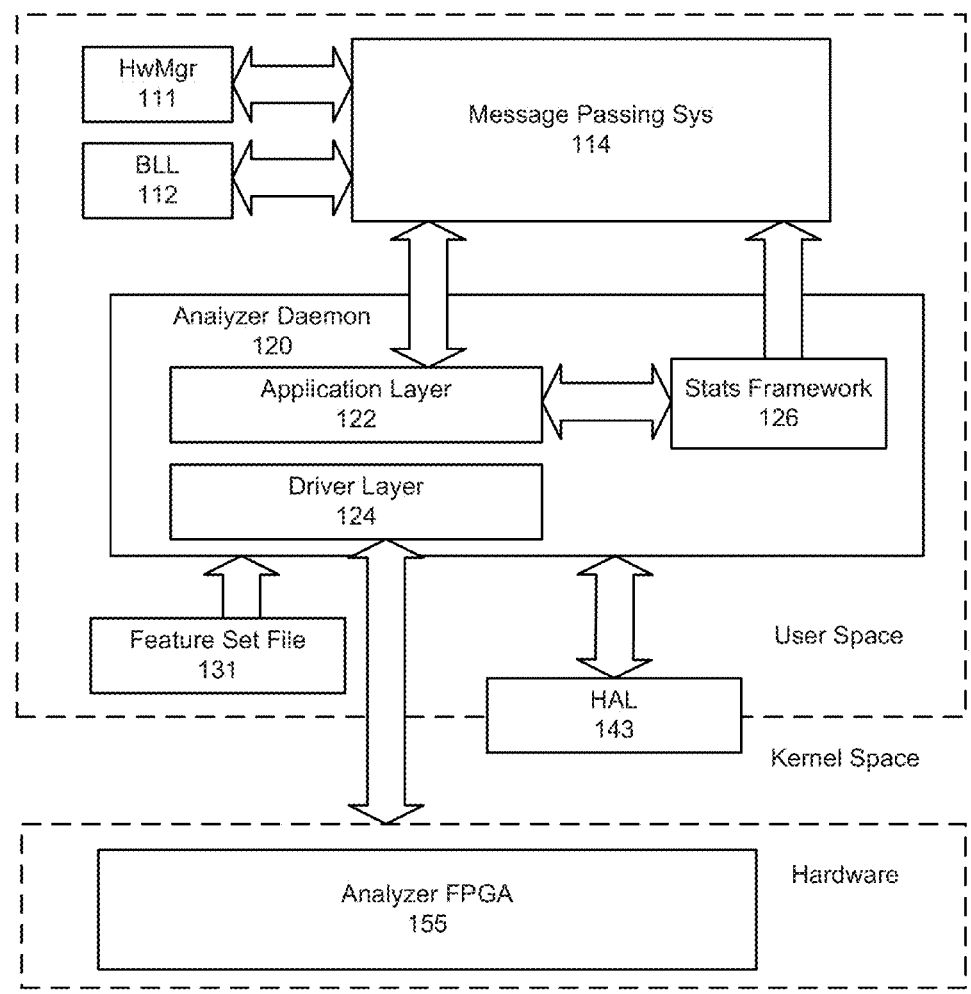
FIG. 6 is a block diagram of that features the analyzer daemon as the central component.

FIG. 6 is a block diagram of that features the analyzer daemon as the central component. The analyzer daemon 353 consists of an upper firmware application layer 630 and a lower level FPGA driver layer 650. It is sometimes referred to simply as the analyzer. The analyzer application layer 630 is a hardware independent layer that is mainly responsible for communication with the BLL 410 via the message passing service 562. It abstracts the interface to the FPGA driver 650, which is the lower layer component of the analyzer daemon. It is a hardware dependent layer that is mainly responsible for translating configuration and statistics retrieval requests from the application layer into hardware specific operations. It is also responsible for extending 32-bit hardware counters into 64-bit database counters. The analyzer and FPGA 675 controls the hardware based, line rate capable receive packet analysis functionality.

FIG. 6 is a high level presentation of the analyzer daemon and its relationship with other entities that reside on the processing card. The analyzer daemon is configured to reflect the specific hardware that it is controlling.

Figure 7:
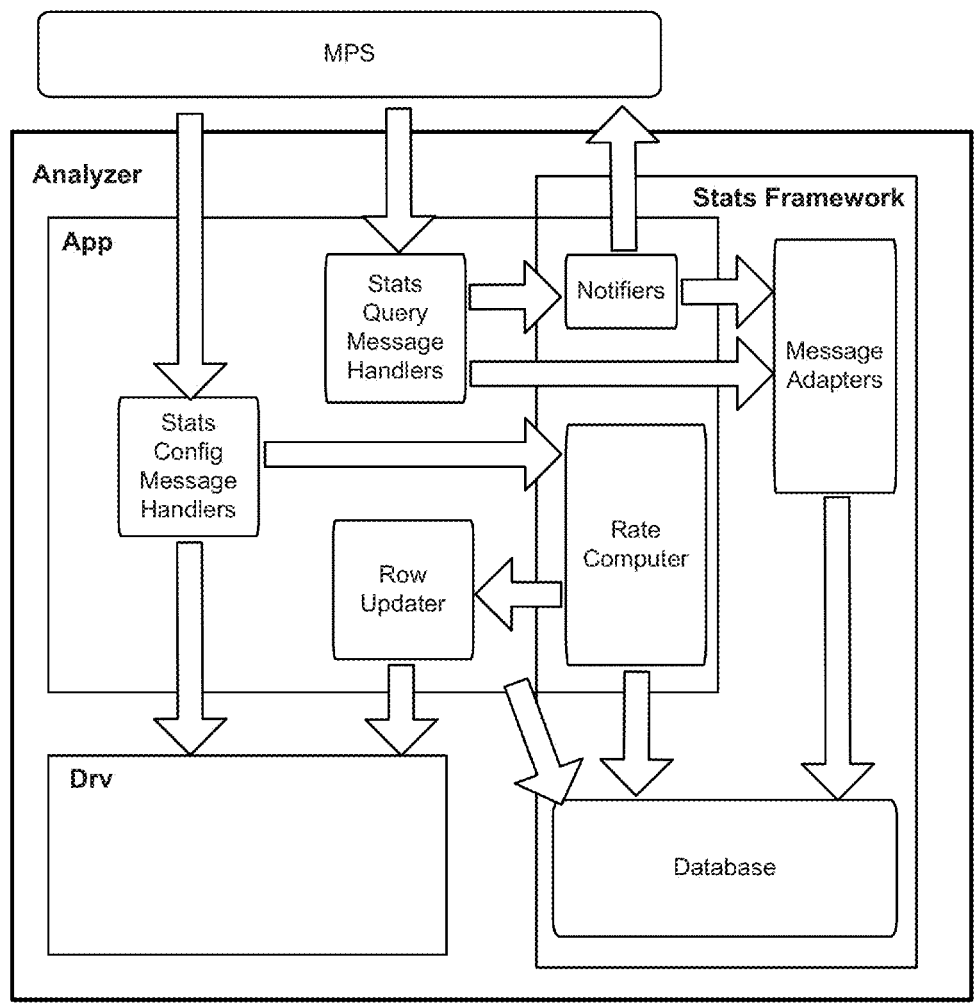
FIG. 7 is a more detailed block diagram of the interaction of the analyzer daemon with the stats framework.

The in-memory database, as will be shown in FIG. 7, is part of the stats framework. Statistics visible to the BLL 410 are stored in the in-memory embedded database of the stats framework 640. The BLL can thus use messages to perform SQL queries on any of the tables in the database, using either synchronous or asynchronous mechanisms. In addition, the BLL can register for asynchronous notifications of any time that a row in the table is added, deleted, or modified. In one embodiment, the in-memory database is instantiated, along with the entire stats framework, for each port on the processing card. In this embodiment, there are multiple tables in the database for port statistics, differential service statistics (related to different types of service required by various IP packets), and test stream statistics. Alternatively, there could be separate instantiations of the database four each port and each of the six tables. Yet alternatively, separate tables or separate instantiations of the database can be maintained for routing packets, host packets, and layer 2/3 packets, all on a per port basis.

The support for various statistics, maintained as columns in the table, may depend on test modules that run on the test device. In some embodiments, rather than having different sets of attributes or columns reached test module, the database may support a single superset of statistics. In a test that does not use a particular column, the value in that column may be set to zero. If this trade-off between memory and ease of programming proves too taxing on memory, alternative solutions such as optional columns or alternative schemas that reuse attributes in the table may be applied.

In one embodiment, a port statistics are maintained for each sample taken. The quantity of rows depends on the sampling rate established by the BLL 410. Typically, rate columns do not appear in this table, because a sufficient number of rows are maintained to allow computation of rates after data collection. To accommodate calculation of rates, it may be desirable to capture one sample more than the number of requested samples, thereby establishing a baseline for calculation of the first rate sample.

The differential service statistics table has rows for each type of service allowed for IP packets. The type of service (e.g., 0 to 255) can be used as an index to table rows. Calculation of rates may be explicitly enabled for the table or particular rows in the table. This table supports real-time rows that are sampled and recorded at a predetermined rate. This allows rates to be calculated after data collection, thereby reducing computing overhead and table size.

The test stream statistics table contains statistics for each stream. The streams may be learned by the analyzer from the stream block 463 or by listening to received streams 473. Rows may be added to the table during a test as a listening process detects new test streams. Rates may be calculated in this table either as rows are updated or in a real time data sampling mode. In the real-time mode, rows are sampled at a predetermined rate and added to the table as they are sampled. Again, this allows calculation of rates after data collection. This table may include more columns for data than the hardware collects at any given time. In some embodiments, the hardware can only track a subset of potential statistics at any given time. Different subsets of statistics may be grouped into stream statistic groups. For counters that are not supported in a currently enabled statistics group, the counter value should be set to zero.

As will be described later in this disclosure, one mechanism for communication between the FPGA and user space is for the FPGA to write values via a direct memory access ("DMA") channel. During data collection, it may be necessary to latch memory so that statistics of some counters are not updated by the FPGA as the vector of counters is read.

Returning to FIG. 6, the analyzer application layer 630 is the upper half of the analyzer daemon. It is responsible for interaction with the BLL 410 via messages. It validates message parameters and translates messages into calls to the analyzer driver 650 and the stats framework 640. The application 630 populates statistics read from the driver into the embedded in-memory database tables. It provides a consistent and user friendly interface for the BLL 410. In one embodiment, the analyzer application layer is multithreaded and uses an adaptive communications environment (ACE) reactor to serialize all timer events, message events and signals. In that embodiment, most operations are performed under the main thread. Additional threads may be spawned by the analyzer application layer 630 to perform high resolution port statistics sampling, as described below.

FIG. 7 is a more detailed block diagram of interaction of the analyzer daemon 353 with the stats framework 640. The analyzer application 630 handles interaction of the analyzer daemon 353 with the stats framework 640. This includes interaction with the embedded database 742. Several interactions are involved. The analyzer application handles instantiation of the stats framework objects at initialization time, such as table descriptors, rate computers, message servers and database instances for ports, etc. It handles look-up and updating of counter values within a row on behalf of the rate computers. It configures the rate computers in compliance with messages from the BLL. It modifies database entries as directed by messages. For instance, it clears rows, deletes rows or makes sure the rows are up-to-date. The analyzer application modifies the database entries per driver maintenance requirements. For instance, it has streams and makes sure that streams are up-to-date, as they change over the course of a test. It hands messages off to the message server, which in turn instantiates and utilizes other stats framework objects. It also performs SQL queries on the database, as necessary.

Components of the stats framework 640 include notifiers 733, message adapters 741, the rate computer 735 and the database instantiations 742. The analyzer application 630 includes message handlers for configuration 731 and queries 1 732. It also includes a row updater 734. The query message handler 732 interacts with the stat frame 640 through the notifiers 733 and the message adapters 741. The configuration message handler interacts with the stats framework 640 and the driver layer 650. It interacts with the framework through the rate computer 735. The analyzer application 630, rate computer 735 and message adapter 741 interact with the database instances 742.

The PortSampler object has a message queue so that: 1) the Sampler Thread can initiate method calls on the PortSampler object which are executed within the context of the main thread; and 2) the main thread can defer method calls on the PortSampler object until after the Start( )Stop( ) methods have returned (ex. in order to send async notifications to the BLL after the response to a Start/Stop PHX-RPC message has been returned). The entries on this message queue are simply functors. Upon instantiation, the PortSampler associates a notification strategy with the message queue such that any push onto this queue schedules an event in the main thread's Reactor, for which the PortSampler has registered itself as a handler. In the handler method, the PortSampler simply pops the functors from the message queue and executes them.

Figure 8:
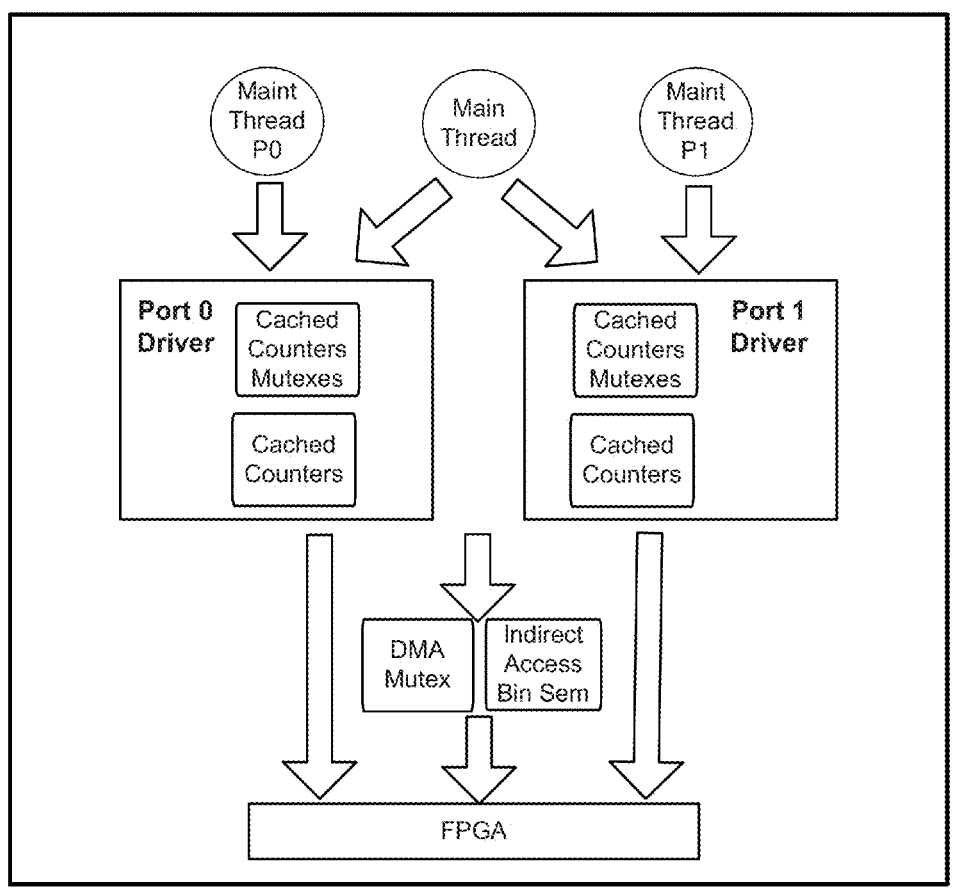
FIG. 8 is a block diagram that provides more detail of one embodiment of the analyzer driver.

FIG. 8 is a block diagram that provides more detail of one embodiment of the analyzer driver. The analyzer driver 650 is the bottom half of the analyzer daemon 353. It is responsible for interaction with the analyzer FPGA, abstracting FPGA implementation so that the analyzer daemon need not be aware of module-specific variations, extending 32-bit FPGA counters to 64-bit values, and performing counter maintenance to avoid wraparound on 32-bit FPGA counters. The analyzer driver runs in user space 610. With assistance from the hardware extraction layer 655, it maps to FPGA registers into the analyzer daemon 353 memory space and uses direct memory access (DMA) to retrieve counters maintained by the FPGA. In one embodiment, the driver is instantiated on a driver-per-port basis.

One feature illustrated in the figure is to translate incremental counts into cumulative counts. That is, when the FPGA counters provide a delta count since the last read, the driver adds that delta count to a previous cumulative counter. To provide current cumulative counters to the application layer, the driver needs to have access to the previous counter total values. In most cases, rather than rely on the application layer to retrieve these values from the database, which would create a risk of the driver being blocked if another thread is holding the databases transaction lock, the analyzer driver 650 caches a copy of the last counter values using non-database structures 823, 829. This is particularly useful during high-resolution sampling with millisecond resolution.

Since multiple threads may attempt to get current counters simultaneously, each type of counter (for instance or statistics differential service statistics, etc.) has a pthread mutex 821, 827, 833 associated with it. This protects the integrity of a given counter type while still allowing concurrent access to different counter types. For instance, a thread accessing port statistics will not be blocked by another thread accessing differential service statistics. Even though counters for streams sampled at normal resolution are not cached in the driver, there still is a mutex associated with stream operations to protect other stream related information in hardware accesses.

The maintenance thread builds on the Adaptive Communications Environment active object pattern. The lifetime of the maintenance thread is equal to the lifetime of the process, as it is spawned when the driver is created and joined when the driver is destroyed. Each type of statistic requires maintenance as its own timeout handler that is scheduled for periodic callbacks from a timer in the context of the maintenance thread. The exception to this is for test stream statistics, as explained below. The period between timeouts depends on the handler type, as well as test module type. This design allows maintenance to occur only as frequently as necessary for each data type. Operation of the port driver in the context of the maintenance thread minimizes the likelihood that maintenance will be blocked by something that the main thread is doing, such as large SQL queries. Large SQL queries have no effect on maintenance, except during stream maintenance, when the stream counter maintenance includes reading current cumulative counters from the database. Using the pthread model, the maintenance thread consumes no CPU time unless it is actively updating some counters.

Since FPGA counters can only be updated from incoming packets while in a "running" state, there is no need to prevent counter rollover while it is in the "stopped" state. Therefore, the analyzer driver unschedules the maintenance timers whenever a stop command is received and reschedules them when a start command is received. Consequentially, the maintenance thread consumes no CPU when the analyzer is stopped.

Some of the FPGA functionality requires the Analyzer Driver to DMA information to/from the FPGA. The Analyzer Driver uses one of the DMA Data Movers that are part of the BCM1125 to do this. This single data mover is shared by the threads within the Analyzer. Thus, a semaphore 833 is used to protect access to DMA operations 835.

An independent HAL 655 DMA object is allocated for each of these, per-port. For each object, the HAL must allocate and map contiguous pages of RAM to support the largest DMA for which each object will be used.

Figure 9:
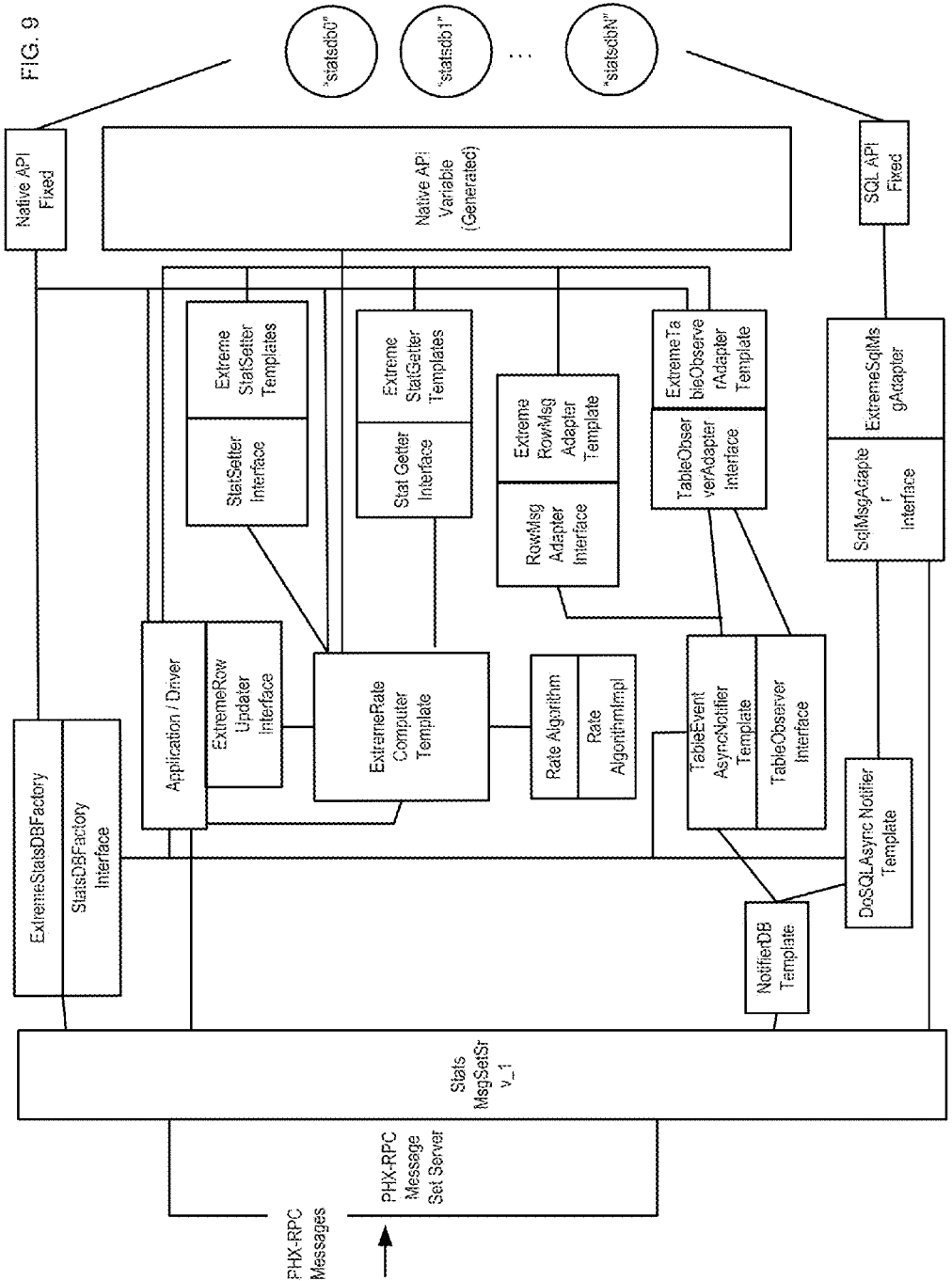
FIG. 9 is a more detailed block diagram of the Stats Framework.

FIG. 9 is more detailed block diagram of the Stats Framework. The eXtremeDB in-memory database requires a significant framework and adapters for implementation, as this figure depicts. The underlying database components are in the right-hand columns of the figure (917, 937, 967, 938, 948, 958). Most of the remaining components are part of the stats framework, except the message passing system 562, and the application and driver layers of the analyzer daemon 630/650.

The underlying database components include two APIs: a proprietary API in fixed 917 and variable 937 parts and a SQL API 967. The proprietary fixed API 917 is for table independent operations, such as create, commit, etc. The proprietary variable API 937 is automatically generated from schema files and is for table dependent operations, such as create, find row, get or set column value. The proprietary API in general is used for updating tables as the statistics change. The SQL API is used mainly for running queries received from the BLL 410 via the message passing system 562. This API supports much of the SQL-89 specification. A database instantiation exists within the address space of the process that created. A Database Management component 913 in the stats framework is responsible for handling generic database-related configuration and maintenance tasks and also for acting as a central point for accessing framework objects. It instantiates a single, independent database per port, as is reflected by the "statsdbX" (938, 948, 958) components in the drawing.

Remote procedure call (RPC) messages from the message passing system are offloaded by a Message Server for statistics-related messages 562. The Message Server executes queries on the database as specified by the RPC messages and returns the result set to the caller. Additionally, at the request of RPC messages, it may configure the Periodic Query Executer and Table Observer 955 to either: periodically execute queries on the database and return the result set to the caller each time; or send periodic notifications to the caller regarding changes that have been made to the contents of the database.

An RPC Message to Database SQL API Adapter 965 component is used to take the SQL query string that is contained in an RPC message and call the proper functions in the database's SQL API in order to execute that query. It then takes the database objects representing the result set of the query and parses their contents into a format suitable to be contained in an RPC message response.

A Generic Table Descriptor to Table Specific API Adapter 935 component is used to translate general database operations that some stats framework components need to perform on database tables into the specific database API functions that perform those operations. This is done so that the stats framework components can remain generic, and thus operate on any database table, yet are still capable of performing those operations which require specific knowledge of the schema of the tables being operated on.

A Periodic Rate Computer 932 component periodically reads configured counter column values from the database tables, computes a "per second" rate for these counters, and updates corresponding rate column values in the given database table. Use of the stats framework involves several steps. First, create a database schema file. Appropriately modify a schema constructor script. Configure the database factory. Implement the message set. Offload messages from the message processing system. Optionally, configure the rate computer. Also optionally, enable table event notifications. Then, proceed with populating the tables. With these steps and the framework detailed by FIGS. 7-8 in mind, one can understand how an in-memory database can be used in a test device.

Next, we provide some examples of real time data access that is enabled by the disclosed stats framework. These examples show how relevant statistics can be retrieved during a test, taking advantage of distributed processing of SQL queries by the independent database instantiations running on the processing cards. Keep in mind that a query that may find its answer in more than one database instantiation is passed to all of the relevant database instantiations and the results returned are combined. The first example shows retrieving only the "page" worth of streams that the user is currently looking at, rather than pulling back all streams and only displaying the ones on the current page:

SELECT StreamIndex, FrameCount, SigCount, FCSErrCount, MinXFerDelay, MaxXFerDelay, SeqRunLength, LostPacketCount, InOrderPacketCount, ReorderedPacketCount, DuplicatePacketCount, LatePacketCount, PRBSBitErrCount, PRBSFillByteCount, IPv4XSumErrCount, TCPUDPXSumErrCount, FrameRate, SigRate, FCSErrRate, LostPacketRate, InOrderPacketRate, ReorderedPacketRate, DuplicatePacketRate, LatePacketRate, PRBSBitErrRate, PRBSFillByteRate, IPv4XSumErrRate, TCPUDPXSumErrRate, Comp32, Comp16_1, Comp16_2, Comp16_3, Comp16_4, InSeqCount, TotalXFerDelay, TotalJitter, TotalInterArrivalTime, ByteRate, StreamIndex FROM StreamStats WHERE StreamIndex BETWEEN 25 AND 49

A sample response showing the contents of one of the rows that matches the criteria is:

---

"int64Values" {array {int64_t 25 int64_t 144 int64_t 144 int64_t 0 int64_t 9 int64_t 10 int64_t 144 int64_t 0 int64_t 144 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 65561 int64_t 0 int64_t 0 int64_t 0 int64_t 0 int64_t 0 int64_t 1435 int64_t 0 int64_t 0 int64_t 0 int64_t 25 } }

---

Subsequent pages of streams data are retrieved on demand.

The next example shows retrieving the summation of stats of streams that are in an associated group (in this case the summation of the streams in a given stream block), rather than pulling back all streams in the group and aggregating the counters in the BLL:

SELECT SUM(FrameCount), SUM(ByteRate)
FROM StreamStats
WHERE StreamIndex BETWEEN 3 AND 102

A response includes one row, since it aggregates many rows:

"int64Values" {array {int64_t 4120 int64_t 0}}

Using this approach, message traffic is greatly reduced. In all likelihood, resources required data reduction on the processing cards are more than offset by the reduced message traffic.

Another example shows retrieving streams that meet a user-generated query (in this case only the top 50 streams, displayed in order of increasing maximum latency, where more than 50000 packets have been received and the maximum latency is greater than 50 ms.) Again, the database instances reduce the data before messaging, rather than pulling back all streams and displaying only the ones that meet the criteria:

---

SELECT StreamIndex, FrameCount, SigCount, FCSErrCount, MinXFerDelay, MaxXFerDelay, SeqRunLength, LostPacketCount, InOrderPacketCount, ReorderedPacketCount, DuplicatePacketCount, LatePacketCount, PRBSBitErrCount, PRBSFillByteCount, IPv4XSumErrCount, TCPUDPXSumErrCount, FrameRate, SigRate, FCSErrRate, LostPacketRate, InOrderPacketRate, ReorderedPacketRate, DuplicatePacketRate, LatePacketRate, PRBSBitErrRate, PRBSFillByteRate, IPv4XSumErrRate, TCPUDPXSumErrRate, Comp32, Comp16_1, Comp16_2, Comp16_3, Comp16_4, InSeqCount, TotalXFerDelay, TotalJitter, TotalInterArrivalTime, ByteRate
FROM StreamStats
WHERE (FrameCount > 50000) AND (MaxXFerDelay > 5000)
ORDER BY MaxXFerDelay ASC
LIMIT 50

---

A sample response showing the contents of one of the rows that matches the criteria is:

---

"int64Values" {array {int64_t 51 int64_t 65225 int64_t 65225 int64_t 0 int64_t 253 int64_t 6341 int64_t 65225 int64_t 0 int64_t 65225 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 0 int64_t 65587 int64_t 0 int64_t 0 int64_t 0 int64_t 0 int64_t 0 int64_t 26210000 int64_t 0 int64_t 0 int64_t 0 } }

---

The corresponding end of test queries are very broad. In addition to the query examples, we provide a few rows of returned data and corresponding translation of the returned data directly into add-row commands for the persistent database 515.

---

SELECT StreamIndex, Comp32, Comp16_1, Comp16_2, Comp16_3, Comp16_4, FrameCount, ByteCount, SigCount, FCSErrCount, AvgXFerDelay, MinXFerDelay, MaxXFerDelay, TotalXFerDelay, SeqRunLength, ExpectedSeqNum, LostPacketCount, InOrderPacketCount, ReorderedPacketCount, DuplicatePacketCount, LatePacketCount, MinFrameLength, MaxFrameLength, PRBSFillByteCount, PRBSBitErrCount, IPv4XSumErrCount, TCPUDPXSumErrCount
FROM StreamStats
WHERE StreamIndex BETWEEN 0 AND 8191 AND FrameCount > 0

---

Additional blocks of data can be collected in a succession query (or could be part of the initial query);

SELECT StreamIndex, Comp32, Comp16_1, Comp16_2, Comp16_3, Comp16_4, FrameCount, ByteCount, SigCount, FCSErrCount, -continued

```
AvgXFerDelay, MinXFerDelay, MaxXFerDelay, TotalXFerDelay,
SeqRunLength, ExpectedSeqNum, LostPacketCount, InOrderPacketCount,
ReorderedPacketCount, DuplicatePacketCount, LatePacketCount,
MinFrameLength, MaxFrameLength, PRBSFillByteCount,
PRBSBitErrCount,
IPv4XSumErrCount, TCPUDPXSumErrCount
FROM StreamStats
WHERE StreamIndex BETWEEN 8192 AND 16383 AND FrameCount > 0
```

Here is a sample row of response data:

```
"int64Values" {
array {
int64_t 0 int64_t 131072 int64_t 0 int64_t 0 int64_t 0 int64_t 0
int64_t 146997
int64_t 18815616 int64_t 146997 int64_t 0 int64_t 10 int64_t 10 int64_t 11
int64_t 1489447 int64_t 146997 int64_t 146997 int64_t 0 int64_t 146997
int64_t 0 int64_t 0 int64_t 0 int64_t 128 int64_t 128 int64_t 0 int64_t
0 int64_t
0 int64_t 0
} }
```

Some Particular Embodiments

The technology disclosed can be practiced as a device or a method the runs on a device. The technology disclosed may be practiced as an article of manufacture such as storage media impressed with logic.

One embodiment is a device reporting results from testing of a system under test or device under test, which are collectively referred to as a "DUT". The test device includes a least one chassis and a plurality of processing cards mounted in the chassis. Multiple chassis can be combined into a single system, using inter-chassis communications. A chassis could hold a single processing card, but it preferably holds multiple cards. In one embodiment, a chassis holds a dozen cards. Alternatively to a chassis, a conventional server, workstation or PC could be fitted with processing cards. The chassis is more versatile, because its form factor can accommodate exposure of more ports than would fit on a typical PCI card. A processing card integrates at least a processor, solid-state memory coupled in communication with the processor, and two or more test ports coupled in communication with the processor that are adapted to be coupled to the DUT during a test. A variety of test ports, many of which are identified above, may be used. In some configurations a dozen test ports are found on a single processing card.

Ports may optionally be organized into port groups. For instance, in one embodiment, a twelve port processing card includes six processors. The processors are separate chips. The processors run their own instances of Linux and control two ports. The processing card includes six port groups, each group sharing processing and memory resources among one or more ports (two ports in this example). In another embodiment, a single high speed port ($10^+$ Gb) is coupled to a Linux instance and multiple processor cores. The single high speed port is a port group of one, because of the resources needed to service the port. In the architecture described, it is readily practical to include up to eight ports in a group, which may be useful when multiple ports are being aggregated into a single communications channel. When we use the term "port group," we refer to a group of ports commonly controlled by shared hardware and software resources. A port group may include one to eight ports, depending on how the supporting hardware and software resources are organized.

The device further includes distributed logic running on the processing cards. The distributed logic includes a plurality of database instances at least one per port or port group. A particular database instance includes at least a unique identifier that distinguishes it from other database instances for messaging, such as receiving queries. The database instance includes one or more tables of sample data collected during the test, the tables residing in the solid-state memory on the processing card. Optionally, if a pooled memory space were available, the database instances could share the pooled memory space. Solid-state memory is specified to avoid the latencies of rotating memory that are experienced during database access and transaction locking A particular database further includes two interfaces: an API interface that updates and adds to the tables during the test; and a query processing interface. The query processing interface can be used either during or after the test. It receives queries, for instance, SQL queries. It selects the sample data responses to the queries and returns the selected sample data. The device further includes at least one communications channel on the chassis coupled in communication with the distributed logic. This communications channel distributes the queries, both queries from users and automatic, end-of-test queries. The communications channel returns the selected sample data responsive to the queries.

In some embodiments, the processing cards further include a specialized logic device to processes test frame data to send to or to receive from the DUT during the test. The specialized logic device is coupled in communication between the processor and the ports. It updates counters during the test frame data processing. The distributed logic periodically collects the sample data from the counters and adds the sample data to the tables or updates the tables via the API interface.

In one variation, the port groups are supported by a plurality of protocol handling modules running on the processing cards that support a multiplicity of devices in device-sessions. In this variation, the device further includes database instances per port group per protocol handling module, whereby different sample data statistics applicable to different protocols are stored in different database instances. Alternatively, a single database per port group may have separate tables for various protocol handling modules. These separate tables allow different sample data statistics applicable to different protocol sources to be stored in separate tables.

In another variation, the test is organized into a plurality of test data streams emulate a multiplicity of data sessions. Device further includes database instances per port per data test string. Alternatively, a single database per port group may have a table for all data streams that interact with that port. A data stream identifier can be attached to each row in the data streams table. In yet another alternative, the ports emulate a plurality of sessions and a plurality of protocols in the sessions. In this other alternative, database instances are running per port group per test data stream per protocol.

In any of the particular embodiments described, the query processing interface may be SQL compatible. Anywhere these port groups are specified as the unit of database organization, single port databases can be used.

The test device embodiment can be extended into a system for real-time data collection. The real-time system further includes management logic running on at least one additional processor that is coupled to the communications channel. This additional processor may be on a separate system, integrated into the chassis, or hosted on a chassis card. The management logic of this real-time system includes at least a user interface, such as a scripting command line or GUI interface, through which a user requests are received. It includes a data selection component or module that translates the user requests into queries for responsive sample data. It further includes a messaging component or module that identifies a plurality of database instances to which the query should be directed, that sends the queries the identified database instances without waiting for responses before sending successive queries to successive database instances, and receives responses from the identified database instances as they become available. A response aggregation component or module combines the selected sample data from the responses. This combined data may be aggregated into a collection, summed or otherwise reduced into a desired form. An output component or module either persists the combined data to nonvolatile memory or makes the combined data perceptible to the user.

Alternatively, the test device embodiment can be extended into a system for end-of-test data collection. Of course, the real-time data collection and end of test data collection systems are compatible and may be combined into an overall system. In the end-of-test data collection system, management logic running on an additional processor and coupled to the communications channel and persistent memory includes a least a data collection component or module issues queries for return of substantially all of the sample data collected by the database instances for at least one segment of the test or, preferably, for the whole test. The data collection module preferably sends successive queries to successive database instances without waiting for completion of query responses. It receives responses from the identified database instances as they become available. The management logic further includes persistent memory coupled in communication with the additional processor and at least one persistent database component or module that maintains a persistent test result database on the persistent memory. The system further includes at least one data translation module that translates the responses directly into update commands and queues the update commands to the persistent database module without waiting for an update confirmations before issuing successive update commands.

The device embodiments above have method counterparts. One method embodiment provides real time results from testing of a system under test or device under test, which are collectively referred to as a "DUT." One environment in which it is useful is a test device that includes at least one chassis and a plurality of processing cards mounted in the chassis. Multiple chassis can be combined into a single system, using inter-chassis communications. A chassis could hold a single processing card, but it preferably holds multiple cards. In one embodiment, a chassis holds a dozen cards. Alternatively to a chassis, a conventional server, workstation or PC could be fitted with processing cards. The chassis is more versatile, because its form factor can accommodate exposure of more ports than would fit on a typical PCI card. A processing card integrates at least a processor, solid-state memory coupled in communication with the processor, and two or more test ports coupled in communication with the processor that are adapted to be coupled to the DUT during a test. A variety of test ports, many of which are identified above, may be used. In some configurations a dozen test ports are found on a single processing card.

The method itself includes instantiating a plurality of database instances, at least one per port group, and associating them with ports. A particular database instance includes at least a unique identifier that distinguishes it from other database instances for messaging, such as receiving queries. The database instance includes one or more tables of sample data collected during the test, the tables residing in the solid-state memory on the processing card. Optionally, if a pooled memory space were available, the database instances could share the pooled memory space. Solid-state memory is specified to avoid the latencies of rotating memory that are experienced during database access and transaction locking A particular database further includes two interfaces: an API interface that updates and adds to the tables during the test; and a query processing interface. The query processing interface can be used either during or after the test. It receives queries, for instance, SQL queries. It selects the sample data responses to the queries and returns the selected sample data. The method further automatically retrieving sample data related to the associated ports during the test and using the API interfaces to add the retrieved sample data to the tables. The method further includes receiving at a plurality of the database instance at least one query via the query processing interfaces, selecting the sample data responsive to the query, and returning the selected sample data during or after the test. In some embodiments, the processing cards further include a specialized logic device to process test frame data to send to or to receive from the DUT during the test. The specialized logic device is coupled in communication between the processor and the ports. It updates counters during the test frame data processing. The method further includes periodically collecting the sample data from the counters and adds the sample data to the tables or updates the tables via the API interface.

In variations on the number of databases instantiated, any of the organizations described with respect to the device embodiments also may be applied to the method embodiments. Moreover, the query received at the database instance may be SQL compatible.

The method embodiment can be extended into a method for real-time data collection. The real-time method further includes receiving a user request during a test at a user interface, such as a scripting, command line or GUI interface. The user request is translated into queries for responsive data, which are sent to identified database instances. Preferably, the queries are sent the identified database instances without waiting for responses before sending successive queries to successive database instances, and receives responses from the identified database instances as they become available. Alternatively, the queries could be issued sequentially and processed synchronously. The method includes receiving responses and combining the selected sample data from the responses. This combined data may be aggregated into a collection, summed or otherwise reduced into a desired form. The method proceeds by either persisting the combined data to nonvolatile memory or makes the combined data perceptible to the user.

Alternatively, the method embodiment can be extended into a method for end-of-test data collection. Of course, the real-time data collection and end-of-test data collection methods are compatible and may be combined into an overall system. In the end-of-test data collection method, queries are issued for return of substantially all of the sample data collected by the database instances for at least one segment of the test or, preferably, for the whole test. Queries to successive database instances may be issued without waiting for completion of query responses or they could be issued sequentially and processed synchronously. Responses from the identified database instances are received as they become available. The method further includes queuing update commands to a persistent database module. As with the requests, these update commands can be sent the database module without waiting for update confirmations or they can be handled sequentially and synchronously.

Articles of manufacture are alternative embodiments. The devices for and method of providing real time data collection and the extended methods of providing real time and end-of-test results are all practiced as computer readable storage media including program instructions that, when loaded on appropriate hardware, either produce one of the devices described or carry out one of the methods described.

Another method involves transmitting programs of computer instructions to be combined with appropriate hardware to manufacture one of the devices described.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for generating test frames, systems including logic and resources to carry out automated generation of test frames, computer readable storage media impressed with logic to carry out automated generation of test frames, or a method of delivering data streams impressed with logic to carry out automated generation of test frames. It is contemplated that modifications and combinations will readily occur to those skilled in the art, which modifications and combinations will be within the spirit of the invention and the scope of the following claims.

We claim as follows:

1. A real time data collection monitoring system reporting results from a multiplicity of streams, the monitoring system including:
    at least one management processor with memory;
    a plurality of distributed processors with memory and monitored ports or port groups, wherein the distributed processors are coupled in communication with the management processor;
    distributed logic running on the distributed processors that includes a plurality of database instances, at least one per port or port group, wherein said database instances include at least:
        one or more tables of monitoring data collected from the monitored ports or port groups during a sampling period, the tables residing in the memory coupled to the distributed processors,
        an API interface that updates and adds to the tables during the sampling period, and
        a query processing interface that receives queries, selects the monitoring data responsive to the queries, and returns the selected monitoring data during and after the sampling period; and
    management logic running on the management processor coupled in communication with the distributed logic that distributes the queries to the distributed processors.

2. The system of claim 1, wherein the distributed processors further include a specialized logic that processes test frame data to send to or received from testing a system or device under test (referred to as a "DUT"), during the sampling period and updates counters during the test frame data processing, the specialized logic coupled in communication with the ports, and the distributed logic periodically collects the monitoring data from the counters and adds the monitoring data to the tables via the API interface.

3. The system of claim 1, wherein the query processing interface is SQL compatible.

4. The system of claim 1, wherein the ports or port groups are supported by a plurality of protocol handling modules running on the distributed processors that emulate a multiplicity of devices in device-sessions, further including database instances per port group per protocol handling module, whereby different sample data statistics applicable to different protocols are stored in different database instances.

5. An end of sapling period data collection system including the system of claim 1, wherein the management logic further comprises:
    a data collection module that issues queries for return of substantially all of the monitoring data collected by the database instances for at least one segment of the sampling period without waiting for query responses before sending successive queries to successive database instances, and receives responses from the database instances as they become available; and
    at least one persistent database module coupled to the data collection module that maintains a persistent monitoring result database.

6. A method of providing real time data collection and monitoring, the method including:
    instantiating a plurality of database instances, at least one per port group of monitored ports, and associating them with the monitored ports, wherein said database instances comprise at least:
        one or more tables of monitoring data collected during a sampling period, the tables residing in memory coupled to a processor,
        an API interface that updates and adds to the tables during the sampling period, and
        a query processing interface that receives queries, selects the monitoring data responsive to the queries, and returns the selected monitoring data during and after the sampling period; and
    automatically retrieving monitoring data from the associated ports during the sampling period and using the API interfaces to the database instances to add the retrieved monitoring data to the tables.

7. The method of claim 6, further including receiving at a plurality of the database instances at least one query via the query processing interfaces, selecting the monitoring data responsive to the query, and returning the selected monitoring data during or after the sampling period.

8. The method of claim 6, further including instantiating a plurality of protocol handling objects for a plurality of the ports or port groups, wherein the instantiation of the database instances further includes instantiating database instances per port or port group and per protocol handling object, whereby different sample data statistics applicable to different protocols are stored in different database instances.

9. A real time monitored data reporting method, including the method of claim 6, further including:
    receiving a user request via a user interface;
    translating the user request into the queries for responsive monitoring data;
    identifying a plurality of the database instances to which the queries should be directed;
    sending the queries to the identified database instances without waiting for responses before sending successive queries to successive database instances;
    receiving responses from the identified database instances as they become available; and
    combining the selected monitoring data from the responses and either persisting the combined data or making it perceptible to the user.

10. An end of sampling period data reporting method, including the method of claim 6, further including:
    issuing queries from a data collection module for return of substantially all of the monitoring data collected by the database instances during the sampling period without waiting for query responses before sending successive queries to successive database instances;

receiving responses from the database instances as they become available;

translating the responses directly into update commands; and queuing the update commands to a persistent database module without waiting for update confirmations before issuing successive update commands.

* * * * *

UNITED STATES PATENT AND TRADEMARK OFFICE
CERTIFICATE OF CORRECTION

| | |
|---|---|
| PATENT NO. | : 8,954,781 B2 |
| APPLICATION NO. | : 14/022032 |
| DATED | : February 10, 2015 |
| INVENTOR(S) | : Silverman et al. |

Page 1 of 1

It is certified that error appears in the above-identified patent and that said Letters Patent is hereby corrected as shown below:

In the Claims

In claim 5, column 20, line 3, replace "sapling" with "sampling".

Signed and Sealed this
First Day of March, 2016

Michelle K. Lee
*Director of the United States Patent and Trademark Office*